United States Patent
Angerbauer et al.

(10) Patent No.: US 10,461,371 B2
(45) Date of Patent: Oct. 29, 2019

(54) METHOD FOR OPERATING A BATTERY CELL

(71) Applicant: Robert Bosch GmbH, Stuttgart (DE)

(72) Inventors: Ralf Angerbauer, Moeglingen (DE);
Alexander Reitzle, Neu-Ulm (DE);
Sarmimala Hore, Stuttgart (DE);
Markus Hald, Jagstzell (DE); Marc Heydemann, Stuttgart (DE); Joachim Fetzer, Bad-Ditzenbach (DE)

(73) Assignee: Robert Bosch GmbH, Stuttgart (DE)

( * ) Notice: Subject to any disclaimer, the term of this patent is extended or adjusted under 35 U.S.C. 154(b) by 454 days.

(21) Appl. No.: 15/021,982

(22) PCT Filed: Sep. 5, 2014

(86) PCT No.: PCT/EP2014/068926
§ 371 (c)(1),
(2) Date: Mar. 15, 2016

(87) PCT Pub. No.: WO2015/039889
PCT Pub. Date: Mar. 26, 2015

(65) Prior Publication Data
US 2016/0226109 A1 Aug. 4, 2016

(30) Foreign Application Priority Data
Sep. 18, 2013 (DE) .................. 10 2013 218 681

(51) Int. Cl.
*H01M 10/42* (2006.01)
*H01M 2/02* (2006.01)
(Continued)

(52) U.S. Cl.
CPC ....... *H01M 10/4235* (2013.01); *H01M 2/024* (2013.01); *H01M 2/34* (2013.01);
(Continued)

(58) Field of Classification Search
CPC ........ H01M 2/34; H01M 2/345; H01M 2/347; H01M 2/348; H01M 2/024;
(Continued)

(56) References Cited

U.S. PATENT DOCUMENTS 5,698,339 A * 12/1997 Kawakami .............. H01M 4/13
427/201
6,001,497 A * 12/1999 Okutoh .................. H01M 10/42
320/134
(Continued)

FOREIGN PATENT DOCUMENTS

| CA | 2054871 | * | 6/1992 | ............ C01B 33/28 |
| DE | 102010054778 | | 7/2011 | |

(Continued)

OTHER PUBLICATIONS

International Search Report for Application No. PCT/EP2014/068926 dated Nov. 20, 2014 (English Translation, 3 pages).

*Primary Examiner* — Jonathan Crepeau
*Assistant Examiner* — Angela J Martin
(74) *Attorney, Agent, or Firm* — Michael Best & Friedrich LLP

(57) ABSTRACT

The invention relates to a method for operating a battery cell (10), in particular a lithium-ion battery cell, having at least one wound or stacked electrode assembly (28) arranged in a housing, said electrode assembly comprising a first electrode layer (12), at least one separator layer (16) and a second electrode layer (14), and a non-aqueous electrolyte containing one or more solvents and one or more conductive salts. When the battery cell (10) reaches a critical state, a chemical substance or a chemical substance mixture (46) is released, which forms complexes with the lithium ions (22) in the electrolyte (26).

18 Claims, 4 Drawing Sheets

(51) Int. Cl.
*H01M 2/34* (2006.01)
*H01M 10/05* (2010.01)
*H01M 10/48* (2006.01)
*H01M 10/0525* (2010.01)
*H01M 10/0567* (2010.01)
*H01M 10/0585* (2010.01)
*H01M 10/0587* (2010.01)

(52) U.S. Cl.
CPC ........... *H01M 2/345* (2013.01); *H01M 2/347* (2013.01); *H01M 2/348* (2013.01); *H01M 10/0525* (2013.01); *H01M 10/0567* (2013.01); *H01M 10/0585* (2013.01); *H01M 10/0587* (2013.01); *H01M 10/48* (2013.01); *H01M 10/486* (2013.01); *H01M 2200/00* (2013.01); *H01M 2200/101* (2013.01); *H01M 2200/20* (2013.01); *H01M 2220/20* (2013.01)

(58) Field of Classification Search
CPC ......... H01M 10/0525; H01M 10/4235; H01M 10/48; H01M 10/486; H01M 10/0567
See application file for complete search history.

(56) References Cited

U.S. PATENT DOCUMENTS

| | | | |
|---|---|---|---|
| 6,689,513 | B1 | 2/2004 | Morigaki et al. |
| 8,309,240 | B1* | 11/2012 | Li ..................... H01M 10/0525 29/623.1 |
| 8,389,505 | B2* | 3/2013 | Kralj ..................... C07D 273/08 514/183 |
| 2013/0071742 | A1* | 3/2013 | Halalay ................. H01M 4/602 429/213 |
| 2015/0056492 | A1* | 2/2015 | Huang ................. H01M 2/145 429/145 |

FOREIGN PATENT DOCUMENTS

| | | | | |
|---|---|---|---|---|
| DE | 102011120879 | | 6/2012 | |
| DE | 102011120879 | * | 6/2014 | ........... H01M 10/48 |
| EP | 0600718 | | 6/1994 | |
| EP | 2159894 | * | 3/2010 | ............... H02H 5/04 |
| WO | 2008105916 | | 9/2008 | |
| WO | 2012170896 | | 12/2012 | |
| WO | WO 2012/170896 | * | 12/2012 | ............... H01M 2/02 |

* cited by examiner

METHOD FOR OPERATING A BATTERY CELL

BACKGROUND OF THE INVENTION

In battery technology, lithium ion technology is used in a wide field of use. Lithium ion battery cells are electrochemical elements which have at least one positive electrode and at least one negative electrode having an intercalation structure into/from which lithium ions can be reversibly intercalated or deintercalated. Intercalation occurs during the charging process of the battery cell and deintercalation occurs during discharge of the battery cell in order to supply current to electrical appliances, where a permissible voltage range is essentially from a minimum discharging voltage of 2.5 V and a maximum charging voltage of 4.2 V. The electrodes are preferably configured with thin walls as metal foil or as metallic mesh structure.

One embodiment of a battery cell and in particular a lithium ion battery cell comprises a metallic housing in which active battery cell components and electrolyte are accommodated. Here, active battery cell components encompass an electrode assembly in which electrodes are arranged in more than two layers in a cross section. Such an electrode assembly preferably has film layers composed of electrochemically active materials (electrodes), conductive materials (current collectors) and separating materials (separators) which can be configured in the (illustrative) form of, for example, jelly rolls in a rolled arrangement or superposed in the form of stacks.

For exchange of the lithium ions to occur in chemical redox reactions the presence of an electrolyte which is introduced into the housing and is, in particular, absorbed by a separator membrane is necessary. In general, the electrolyte comprises a lithium ion electrolyte salt, preferably lithium hexafluorophosphate ($LiPF_6$), dissolved in a water-free solvent, for example ethylene carbonate or dimethyl carbonate.

The behavior of the respective battery cells or a battery pack assembled therefrom in the event of electrical overstressing, for example in the case of overcharging, under thermal stress, in particular at excessive cell temperatures, in the case of mechanical overstressing, e.g. in the case of damage to the cell housing or in the case of an unintended short circuit, for example due to a malfunction, is critical in lithium ion technology. Here, overheating can occur in the battery cell, which may lead to the metallic lithium depositing at the anode. Furthermore, cathode decomposition with liberation of strong oxidants can occur and bring about a vigorous exothermic reaction in the electrolyte. In this case, hot gases which increase the pressure in the interior of the battery cell are evolved, and an uncontrolled temperature increase and possibly burning and even explosion of the battery cell can occur (thermal runaway).

DE 10 2011 120 879 A1 discloses a method for operating a battery, in which when a critical state of a battery comprising a plurality of battery cells is detected, a reaction material is liberated in the interior of at least one single cell by means of a battery monitoring unit, bringing about a decrease in voltage within the at least one single cell or an increase in the internal resistance of the at least one single cell. The battery monitoring unit, which is coupled to a collision sensor system and/or deformation sensor system and, for example, detects severe mechanical damage and/or abnormal positional changes in the battery, determines a functional parameter which measures a charging and/or discharging state and/or an age and/or a degree of damage to the battery or to the single cell. The reaction material can be introduced from the outside or is kept in stock in a vessel which can be opened in a targeted manner by means of electric power, heat, pressure and/or high frequency. The reaction material can contain substances which increase the viscosity of the electrolyte.

Furthermore, it is known from DE 10 2010 054 778 A1 to add further additives which improve the cycling stability and/or operational safety to an electrolyte which is used in a secondary lithium ion cell and consists of an electrolyte salt dissolved in one or more solvents. In this context, mention is made of chelating agents which can form complexes with metal cations which can be released from the positive electrode. Crown ethers, cryptands or spherands, inter alia, which capture undesirable metal cations and immobilize them in order to prevent the migration of such metal cations through the electrolyte solution, with the lithium ions being at the same time adversely affected to only a small extent, are known.

SUMMARY OF THE INVENTION

The invention proposes a method for operating a battery cell, in particular a lithium ion battery cell, comprising at least one rolled or stacked electrode assembly which is arranged in a housing and has a first electrode layer, at least one separator layer and a second electrode layer and a nonaqueous electrolyte containing one or more solvents and also one or more electrolyte salts. When a critical state of the battery cell is reached, a chemical substance which forms complexes with lithium ions in the electrolyte is released. Furthermore, a lithium ion battery and an apparatus for operating a corresponding battery are described.

The electrode assembly is, for example, an electrode roll having a separator layer arranged between the electrodes. As an alternative, the electrode assembly can also comprise plate-shaped electrodes. The housing of the battery cells is preferably a solid housing composed of aluminum or stainless steel, which is also referred to as hard case.

A lithium ion battery cell goes into a critical state in the event of severe stress or overstressing, in the case of damage or else in normal operation when strong heating occurs. During overstressing of the lithium ion battery cell, more lithium is extracted from the active cathode material and correspondingly more lithium is introduced into the anode material, and the electrodes become thermally unstable and the cathode material in particular tends to undergo decomposition with loss of oxygen. Furthermore, heating of the battery cell occurs as a result of dissipation of the electric energy introduced, with the heating and the dissipation being able to lead to thermal runaway of the battery and burning of the battery. In order to prevent a possible escalating critical state of the battery cell, it is proposed that a chemical substance or a mixture of chemical substances which undergo strong interactions, in particular form complexes, with the lithium ions be released.

A suitable chemical substance or a suitable mixture of chemical substances generates strong interactions with the lithium ions present in the electrolyte, in particular electrostatic intermolecular forces, hydrogen bonds and/or van der Waal forces. In particular, the positively charged lithium cations are attracted by electronegative elements of host molecules and with these form stable supramolecular compounds. A supramolecular compound of this type can be achieved by means of molecular receptors which are capable of forming selective bonds with the metal cations present and especially with lithium ions. Monocyclic ionophores, for example nonactin, or cyclic polyethers, for example dibenzo[18]-crown-6, are examples of suitable molecular receptors.

Suitable chemical substances or mixtures of chemical substances have to be able to complex the relatively small lithium ions which move between the negative and positive electrodes strongly despite their size and their three-dimensional construction. The chemical substance or the mixture of chemical substances can contain at least one crown ether, a podand, a cryptand, a spherand and mixtures thereof.

A crown ether is a macrocyclic polyether in which the polyether ring contains oxygen donor atoms which can form a complex with a metal cation. Some or all of the oxygen donor atoms can be replaced by nitrogen atoms or sulfur atoms, in which case the compounds are correspondingly assigned to the group of azocrowns or thiacrowns. A crown ether can be monocyclic, with formation of a two-dimensional ring for complexation with a metal ion, or polycyclic, in which case the crown ether forms a three-dimensional cage for complexation with the metal ion. One group of crown ethers comprises the metalla-crown ethers which can, as metal-organic complexes, selectively bind cations and/or anions. The metalla-crown ethers have hollow spaces which are suitable in terms of shape and size for selectively including metal ions, with the selectivity being determined essentially by the ring size.

In a first embodiment, the chemical substance or the mixture of chemical substances is kept in stock in at least one vessel which is arranged within a battery cell. Preference is given to providing a plurality of vessels, for example pockets, bags or chambers which are filled with the chemical substance or a mixture of chemical substances. In particular, a separator membrane used in the battery cell can be configured as film or nonwoven fabric in strip form, with the at least one vessel, preferably a plurality of vessels, being arranged on a surface of the separator membrane. Here, the vessels can be provided on the separator membrane in the form of, for example, depressions which are closed by an element, for example configured as a film. As an alternative, the vessels can be adhesively bonded to the separator membrane or rolled up together with the battery roll. Vessels in the form of a bag or a pocket can also be joined to the battery roll or a hard case housing.

In particular, a strip-like separator membrane has the vessels which on rolling or flat rolling to give the electrode assembly referred to as jelly roll forms the outer separator membrane.

The vessels which contain the chemical substance or the mixture of chemical substances preferably open in a targeted manner, for example as a result of the action of electric current, heat, pressure and/or high frequency. In one embodiment, the at least one vessel is made of a material which begins to melt, disintegrates or dissolves or opens in another way at an elevated temperature or at a defined limiting voltage, so that the chemical substance or the mixture of chemical substances present therein, in particular the molecular receptors, combine with the electrolyte and display their action in respect of the lithium ions present. Here, it has to be ensured that the at least one vessel opens only when a critical state, defined, for example, by a limiting temperature and/or a limiting voltage in the battery cell, is exceeded, but this action must commence at the correct time before thermal runaway of the battery cell. Tolerable temperatures during normal battery operation are in the range from 70° C. to 100° C. However, with regard to a limiting voltage, which in the case of lithium ion cells is a maximum of 4.2 V, it should be ensured that possible small overcharging events are still tolerated. Thus, the protective function provided by the chemical substance or the mixture of chemical substances commences only in the case of significant overcharging and not merely at the maximum permissible cell voltage. The vessel can also open in the case of a pressure rise in the range from 3 bar to 10 bar.

Suitable materials for the vessel are polymers or metals, taking into account, as properties, a higher melting point than a temperature normally reached during operation or a voltage which is significantly above the limiting voltage. An example which may be mentioned is low density polyethylene (LDPE).

In an alternative embodiment, the chemical substance or the mixture of chemical substances is kept in stock in at least one vessel which is arranged outside the battery cell, with there being a connection to the interior of the battery cell which can be opened when a critical battery state is reached. The chemical substance or the mixture of chemical substances is introduced from the outside into the interior of the battery cell, for example when a valve on the connection opens appropriately. Furthermore, a fluid connection between battery cell and at least one vessel arranged outside can be provided by a movable tube which penetrates a, for example thin-walled, cell housing and the at least one vessel at a defined rupture point provided on the latter, and through which the chemical substance or the mixture of chemical substances comes into contact with the electrolyte.

In a further embodiment, the at least one vessel is opened, initiated by an actuator, at a critical state of the battery cell, where the actuator can be any element which is suitable for opening the at least one vessel containing the chemical substance or the mixture of chemical substances. For example, a heating wire which is in contact with the at least one vessel in such a way that the latter can be opened locally is suitable. As an alternative, it is possible to use an actuator configured as bimetal element which as a result of a temperature change comes into contact with the at least one vessel in such a way that the latter is opened.

The actuator which is controllable so as to open the at least one vessel is activated by means of a signal sent by an evaluation unit. In particular, the evaluation unit can be a simple electronic circuit or another electronic component, for example a transistor, which is designed to switch at a particular voltage and thus activate the actuator. As an alternative, the use of an existing control device or a control device which is additionally integrated into the apparatus is also conceivable; here, for example, it is possible to use a battery control unit (BCU) present for monitoring the battery or an engine control device of a vehicle.

The activation of the actuator is based on a state of the battery cell to be detected, with, for example, sensors which continuously and/or discontinuously measure relevant measurement parameters being provided. Relevant measurement parameters are, inter alia, pressure, temperature, voltage and/or parameters which are significantly changed by collision, deformation, damage. A charging and/or discharging state and/or age and/or degree of damage to the battery or the battery cell can be concluded from the measurement parameters or parameters determined. The measurement parameters or parameters determined can be compared in the evaluation unit with limit values stored there, and in the case of a deviation from the stored limit values the signal is sent to the actuator so that release of the chemical substance or the mixture of chemical substances and ultimately interruption of current flow in the battery cell occurs.

The solution proposed according to the invention provides, in a simple and reliable way, a method for protecting a battery or battery cell, in particular a lithium ion cell, against overstressing which can, for example, lead for the abovementioned reasons to thermal runaway of the battery and to burning of the battery.

A critical operating state, which can be detected and evaluated by means of, for example, sensors and evaluation units already used in a battery system, is recognized in good time. An action countering overcharging can be brought to bear in good time, with lithium ions being bound in the electrolyte and an internal short circuit thus being prevented.

The integration of overcharging and overheating protection within a lithium ion cell offers an effective preventive measure, with, in particular, the automatic chemical binding of the lithium ions in the electrolyte, as described according to the invention, increasing the safety of such lithium ion cells.

The provision of the chemical substance suitable for complexation or a mixture of chemical substances suitable for this purpose in separate vessels offers the advantage that this is not an addition to the electrolyte which brings about the irreversible action even at voltages which are only little above the permissible cell voltage. Rather, it is possible to specifically set limit values above which the chemical substance is to display its effect on the lithium ions.

The solution proposed according to the invention considerably improves the intrinsic safety of the battery cell by binding of lithium ions in the event of an accident. The occurrence of electrochemical reactions is prevented in good time, so that an adverse effect on or hazard to the surroundings does not occur.

BRIEF DESCRIPTION OF THE DRAWINGS

Further advantages and embodiments of the invention are illustrated by the drawings and explained in detail in the following description.

The drawings show.

DETAILED DESCRIPTION

Figure 1:
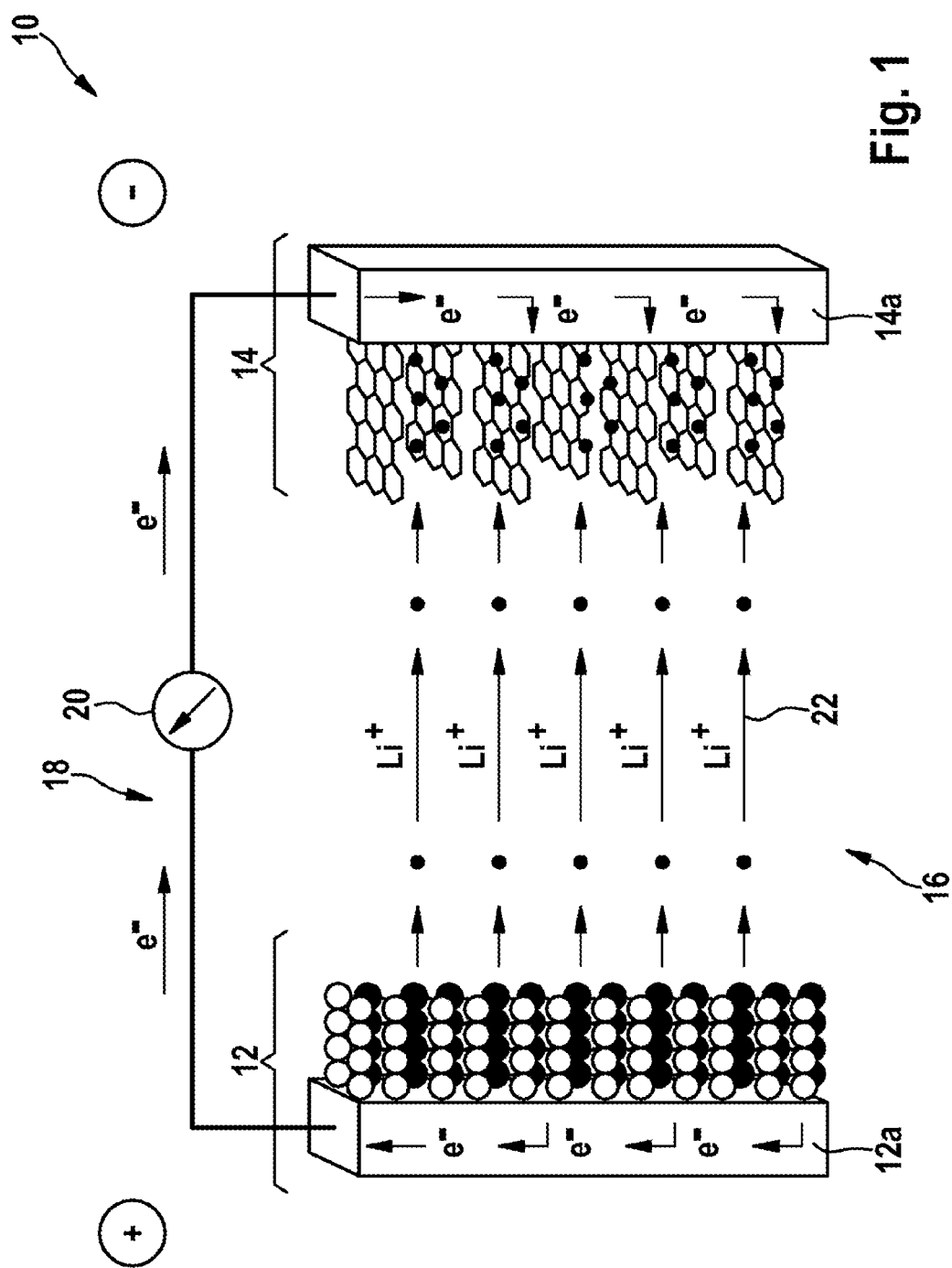
FIG. 1 the direction of migration of lithium$^+$ ions during the charging process from the positive electrode to the negative electrode of a lithium ion cell.

FIG. 1 shows a secondary lithium ion battery cell 10 according to the prior art having a positive electrode 12 (cathode), a negative electrode 14 (anode), a separator 16 which is arranged between the two electrodes 12, 14 and an interruptible external current circuit 18 which connects the positive electrode 12 and the negative electrode 14. The external current circuit 18 comprises a voltage measuring device 20. The separator 16 is arranged between the positive electrode 12 and the negative electrode 14 in order to prevent physical contact between the two electrodes 12, 14 and thus a short circuit. A current collector 12a on the positive side and a current collector 14a on the negative side can be arranged on or near the positive electrode 12 or negative electrode 14, respectively, in order to collect free electrons from the external current circuit 18 or to move free electrons to an external current circuit 18. The positive current collector 12a consists, for example, of aluminum, and the negative current collector 14a of copper. The positive electrode 12, the negative electrode 14 and the separator 16 can each be impregnated with an electrolyte solution which is capable of conducting lithium ions 22. Lithium ions 22 are incorporated and released both at the positive electrode 12 and at the negative electrode 14. The incorporation of lithium ions 22 occurs by intercalation into the negative electrode 14 during the charging process (FIG. 1). The release of lithium ions 22 is effected by deintercalation from the negative electrode 14 during the discharging process (not shown) for supplying power to electric appliances.

Figure 2:
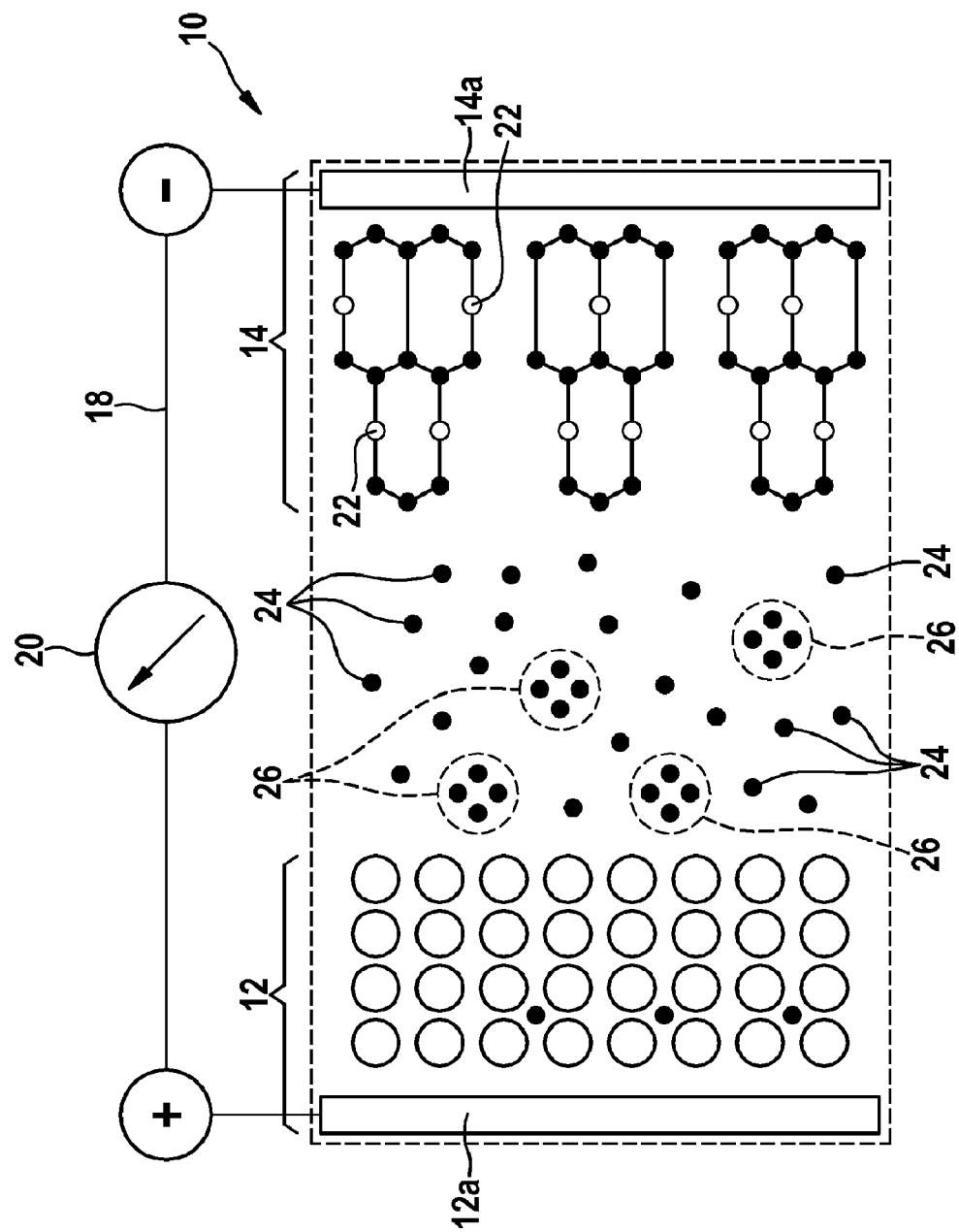
FIG. 2 a view of the lithium ion cell after release of the chemical substance for binding freely mobile lithium ions.

FIG. 2 schematically depicts the lithium ion battery cell 10 in which, in a critical battery state, a chemical substance or a mixture of chemical substances 46 which undergoes strong interactions with the lithium ions 22 present in the electrolyte is released according to the invention. A critical state of the lithium ion battery cell 10 can, inter alia, be present when the voltage is above 4.2 V. The chemical substance or the mixture of chemical substances 46, here comprising molecular receptors 24, is present in the electrolyte, with the chemical substance or the mixture of chemical substances 46 complexing with the lithium ions 22 to form stable and neutral compounds. The capture of the lithium ions 22 in the electrolyte greatly influences and ultimately prevents the migration of the lithium ions 22 between the positive electrode 12 and the negative electrode 14. Here, the molecular receptors 24 are selected so that they form, in particular selectively, corresponding complexes 26 with the lithium ions 22. The amount of molecular receptors 24 added can vary within wide limits which are generally predetermined by the chemistry of the lithium ion battery cell 10, the composition of the positive electrode 12 and the negative electrode 14 and the expected rate at which the lithium ions 22 are introduced into the electrolyte during the critical state of the battery cell 10. Suitable molecular receptors 24 are selected from a large number of possible complexing agents, with crown ethers being particularly suitable.

Figure 3:
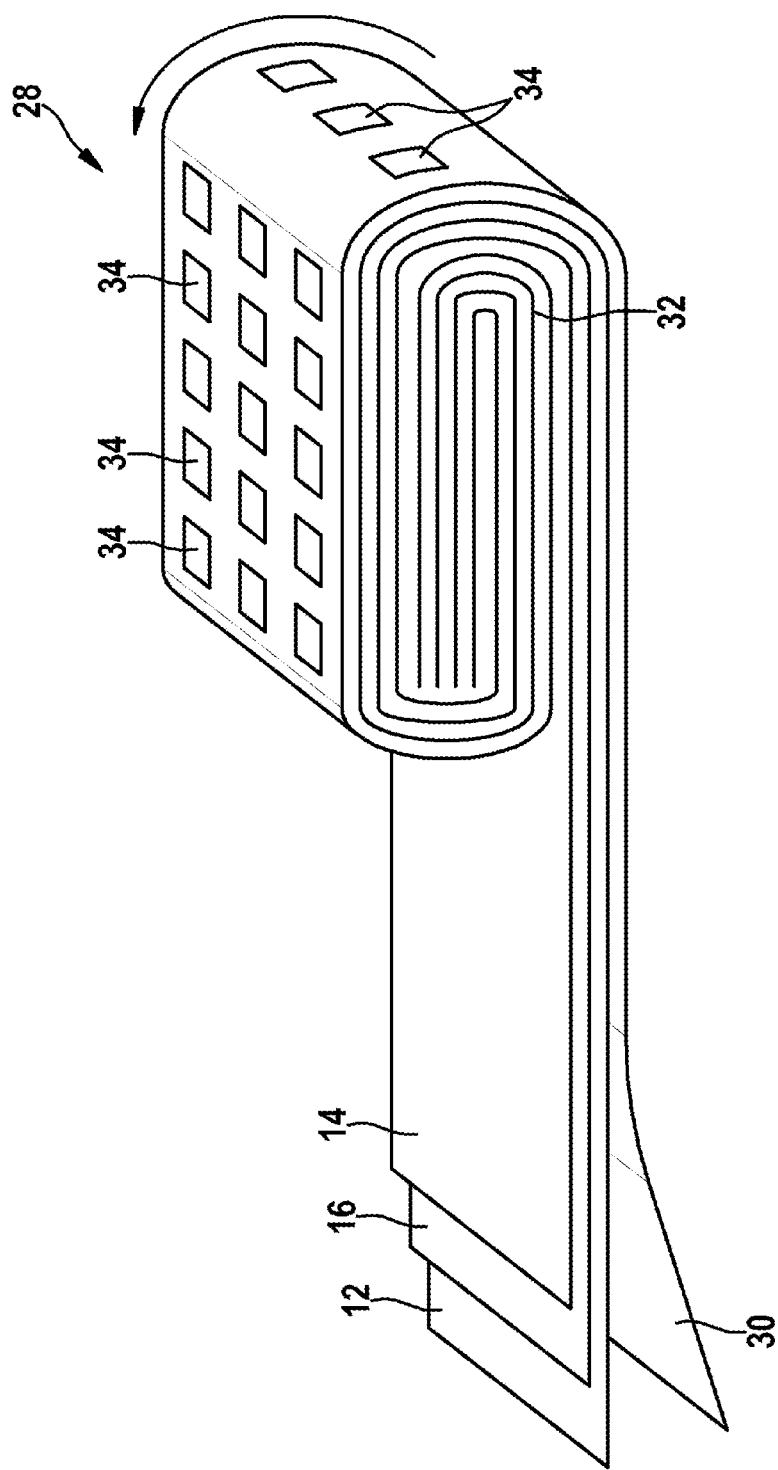
FIG. 3 a view of an electrode assembly having an outer separator membrane with integrated vessels.

FIG. 3 depicts an electrode assembly 28 having a positive electrode 12 configured as a film, a negative electrode 14 configured as a film and a separator 16 arranged in-between. Furthermore, an outer layer represents a further separator membrane 30. Preference is given to configuring the individual components 12, 14, 16 and 30 as strips and rolling these up to form a jelly roll 32, i.e. a battery roll. As separator 16, it is possible to use a porous strip, e.g. a porous film or a nonwoven fabric. The outer separator membrane 30 comprises, as shown in FIG. 3, a number of vessels 34 in which the chemical substance or the mixture of chemical substances 46, in particular comprising the molecular receptors 24, is kept in stock. A vessel 34 can be configured as a depression in the outer separator membrane 30, which is closed by means of a cover. The cover can, for example, be made of a material which melts or dissolves at a temperature or voltage which is critical in respect of the lithium ion battery cell 10. Materials of this type can be polymers or metals having appropriate melting points.

Figure 4:
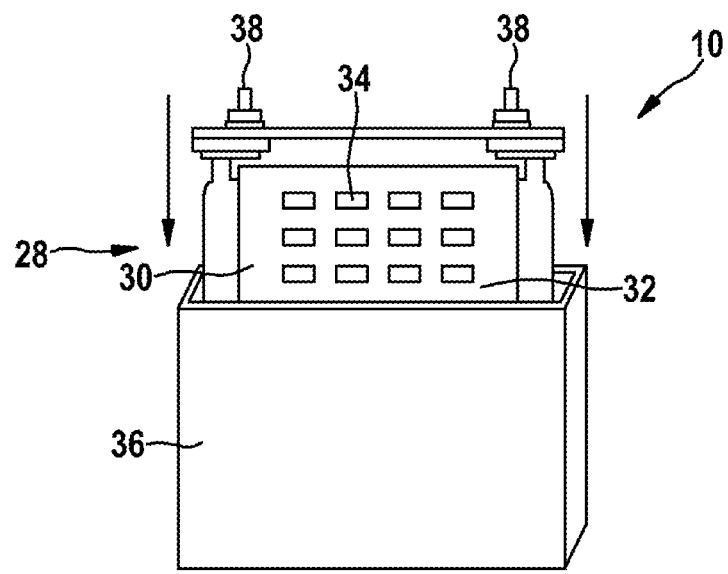
FIG. 4 a view of a lithium ion battery according to the invention.

FIG. 4 depicts the electrode assembly 28 rolled up to form a jelly roll 32 which is introduced into a battery cell housing 36. The outer surface of the electrode assembly 28 is formed by the outer separator membrane 30 in which the plurality of vessels 34 is arranged. Furthermore, it can be seen from FIG. 4 that a lithium ion battery cell 10 comprises further components, for example pole connections 38. These vary in size and shape depending on the use of a lithium ion battery cell 10, with the lithium ion battery cell 10 being able to be connected in series or in parallel with further battery cells in order to provide a higher voltage and achieve a higher current density.

Figure 5:
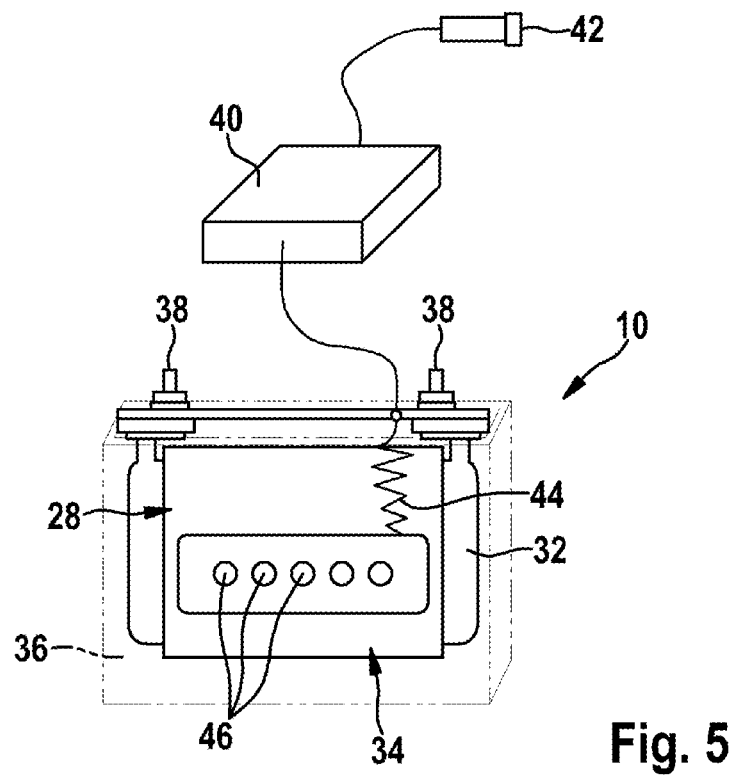
FIG. 5 a schematic depiction of an apparatus for operating a lithium ion battery cell according to the invention.

FIG. 5 shows the lithium ion battery cell 10 comprising the electrode assembly 28, configured as jelly roll 32, arranged in the battery cell housing 36 and the pole connections 38.

The vessel 34 in which the chemical substance or the mixture of chemical substances 46, in particular comprising the molecular receptors 24, is kept in stock is arranged on the electrode assembly 28. The lithium ion battery cell 10 is connected to an evaluation unit 40 which in turn is connected to a means for determining measurement parameters, here in the form of a sensor 42. The sensor 42 is, for example, a collision sensor of a vehicle which detects a collision of the vehicle which could ultimately also lead to damage to the battery. Furthermore, the cell voltage of the lithium ion battery cell 10 can be determined by means of a cell voltage measuring device connected to the pole connections 38. FIG. 5 shows an actuator 44 which is activated by a signal which is sent by the evaluation unit 40 in such a way that it brings about release of the chemical substance or the mixture of chemical substances 46. For example, the actuator 44 can be configured as a heating wire which, by increasing the temperature at a contact point with the vessel 34, allows the latter to sweat so that molecular receptors 24 kept in stock therein display their action in the electrolyte in respect of the lithium ions 22 so as to lead to complex formation.

The invention claimed is:

1. A method for operating a lithium ion battery cell (10) comprising at least one rolled or stacked electrode assembly (28) which is arranged in a housing (36) and has a first electrode layer (12), at least one separator layer (16) and a second electrode layer (14) and a nonaqueous electrolyte containing one or more solvents and also one or more electrolyte salts, the method comprising releasing, when a critical state of the battery cell (10) is reached, a chemical substance or a mixture of chemical substances (46) which forms complexes (26) with lithium ions (22) in the electrolyte.

2. The method as claimed in claim 1, characterized in that the chemical substance or the mixture of chemical substances (46) contains molecular receptors (24) which undergo selective interactions with lithium ions (22).

3. The method as claimed in claim 2, characterized in that the molecular receptors (24) are selected from the group consisting of macrocyclic ionophores and cyclic polyethers.

4. The method as claimed in claim 2, characterized in that the molecular receptors (24) belong to the group of metallacrown ethers and complexes thereof.

5. The method as claimed in claim 1, characterized in that the chemical substance or the mixture of chemical substances (46) is kept in stock in at least one vessel (34) within the battery cell (10).

6. The method as claimed in claim 5, characterized in that the at least one vessel (34) in which the chemical substance or the mixture of chemical substances (46) is kept in stock is arranged on an outer layer of the at least one electrode assembly (28) and is made of a material which in the case of a critical state of the battery cell (10) changes at least partially so that the chemical substance or the mixture of chemical substances (46) is released.

7. The method as claimed in claim 1, characterized in that the chemical substance or the mixture of chemical substances (46) is kept in stock in at least one vessel (34) outside the battery cell (10), with a connection to the battery cell (10) which is opened in the case of the critical state of the battery cell (10) in order to release the chemical substance or the mixture of chemical substances (46).

8. The method as claimed in claim 7, characterized in that the connection is provided by a valve which opens in the case of the critical state of the battery cell (10).

9. The method as claimed in claim 7, characterized in that the connection is provided by a movable element which in the case of the critical state of the battery cell (10) introduces the chemical substance or the mixture of chemical substances (46) into the battery cell (10).

10. The method as claimed in claim 1, characterized in that the critical state of the battery cell (10) is verified, with at least one measurement parameter being measured by at least one measurement device (42) and, in the case of the at least one measurement parameter deviating from a limit value, the chemical substance or the mixture of chemical substances (46) is released.

11. The method as claimed in claim 10, characterized in that the at least one measurement parameter is pressure, temperature and/or voltage of the battery cell (10).

12. The method as claimed in claim 10, characterized in that the at least one measurement device (42) is a pressure sensor, temperature sensor, voltage sensor, current sensor and/or an acceleration sensor for detecting collisions.

13. The method as claimed in claim 10, characterized in that the at least one measurement parameter is compared in an evaluation unit (40) with a stored limit value and in the case of deviations from the limit value the evaluation unit (40) passes a signal to an actuator (44) which brings about the release of the chemical substance or the mixture of chemical substances (46).

14. The method as claimed in claim 13, characterized in that the actuator is configured as a hot wire or as a bimetal actuator.

15. The method as claimed in claim 13, characterized in that the evaluation unit (40) is an electronic component, an electronic circuit or a control device which is a separate component or an existing control device.

16. A lithium ion battery cell (10) comprising at least one rolled or stacked electrode assembly (28) which is arranged in a housing (36) and has a first electrode layer (12), at least one separator layer (16) and a second electrode layer (14) and a nonaqueous electrolyte containing one or more solvents and also one or more electrolyte salts, characterized in that in a critical state of the battery cell (10) a chemical substance or a mixture of chemical substances (46) which forms complexes (26) with lithium ions (22) in the electrolyte is released.

17. An apparatus for operating a battery comprising a number of battery cells (10), characterized in that the battery is coupled to an evaluation unit (40) which brings about the release of a chemical substance or a mixture of chemical substances (46) at least in one battery cell (10) when a critical state of the at least one battery cell (10) is detected, wherein the chemical substance or mixture of substances forms complexes with lithium ions in the electrolyte.

18. The method as claimed in claim 6, wherein the outer layer is an outer separator membrane (30).

* * * * *